Figure 1:
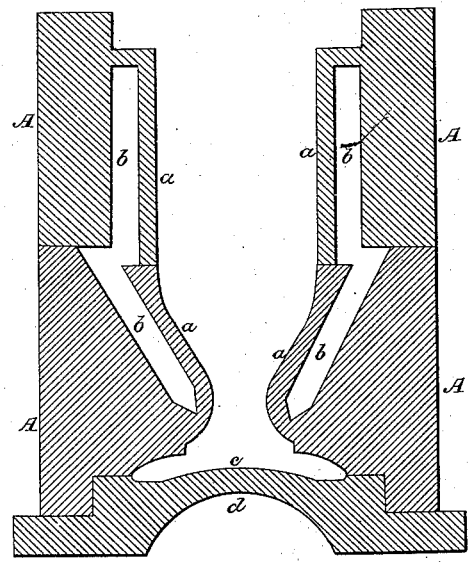
Figure 4:
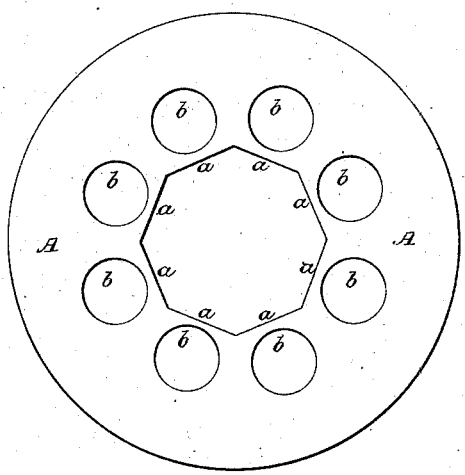
Figure 2:
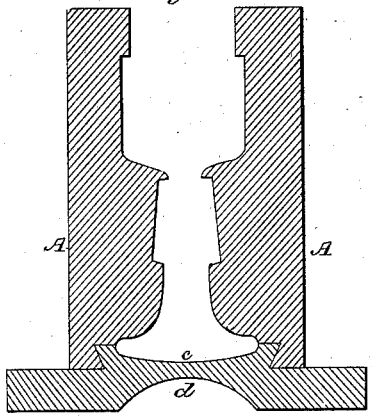
Figure 3:
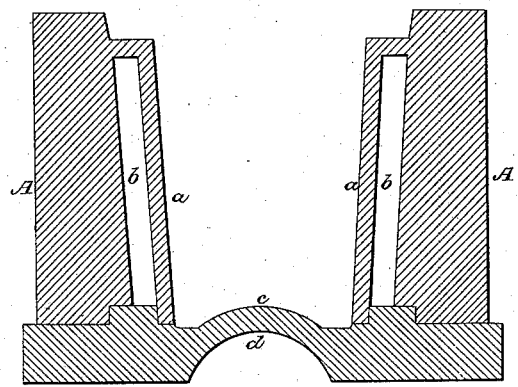

W. POUNTNEY.
METALLIC MOLD FOR MOLTEN GLASS.

No. 43,224.  Patented June 21, 1864.

Witnesses:

Inventor:
William Pountney

UNITED STATES PATENT OFFICE.

WILLIAM POUNTNEY, OF BROOKLYN, NEW YORK.

IMPROVED METALLIC MOLD FOR MOLTEN GLASS.

Specification forming part of Letters Patent No. 43,224, dated June 21, 1864.

*To all whom it may concern:*

Be it known that I, WILLIAM POUNTNEY, of Brooklyn, in the county of Kings, State of New York, have invented certain new and useful Improvements in the Construction of Metallic Molds for Forming and Pressing Molten Glass; and I do hereby declare that the following is a full and exact description of my said improvements and of the manner of app'ying and using the same, reference being had to the drawings accompanying and making part of this my specification.

In the manufacture of a variety of articles of glass by pressure of the molten glass in the molds, composed of cast-iron—such, for example, as bottle-stoppers, tumblers, and beer-glasses—it is considered desirable to have the surfaces which are most exposed to view and to the touch of a smooth finish, having the appearance and luster of a polish. This has not heretofore been attained except by a secondary process subsequent to the casting or molding, and which subsequent process consists in reheating to a temperature somewhat below that of melting the article so manufactured, or the particular part of it which it is desired to have smooth and clear. This is what is called, in the technical language of glass manufacturers, "the fire-polish," and it requires considerable additional time, labor, and expense. The reason of the glass not receiving the desired smoothness and appearance of polish in the molds is that the molten glass, when it first comes in contact with the colder metal of the mold, receives a sudden chill and has a tendency to be repelled from the iron, which causes a contracting and wrinkling of the surface of the glass so in contact with the iron, which gives the glass the uneven surface. This difficulty cannot be removed by heating the molds, because when they are heated beyond a certain degree the glass adheres to the sides of the molds with which it is in contact and cannot be removed without destroying the casting.

My invention and improvements are based upon the principle of slowly and gradually conducting the heat from the molten glass, or from that particular part of it which it is desired shall have the appearance of a polish. To effect this result, instead of making the parts of equal thickness of iron, as is now practiced, I make the part of the mold which is to come in contact with the part of the glass to which the smooth surface is to be given very much thinner than the general thickness of the body of the mold. The operation of this change is as follows: When the molten glass comes in contact with the thinner or less body of metal of the mold it is able to impart a portion of its heat immediately to the thinner portion of the iron, which is thus raised in temperature nearer to that of the glass without repelling the glass or wrinkling it, and the heat thus imparted gradually and moderately passes and is diffused into the thicker parts of the mold, so that the thin parts do not become too highly heated. The result is to give the glass a smoothness and appearance of polish when it comes from the mold not heretofore attainable.

In the accompanying drawings I have represented the molds adapted to the molding of several articles of common use.

Figure I is a vertical cross-section through the center of the mold for a beer-glass. Fig. II is a similar section of a mold for a bottle-stopper. Fig. III is a similar section of a mold for a tumbler. Fig. IV is a top view of Fig. III.

I have selected these particular molds merely for illustrating my invention. I do not confine it to these articles, but claim its application to every article of glass for which a smooth and clear surface is desirable and which may be cast in molds. I would particularly mention the utility of the invention in its application to the manufacture of drops or pendants for the ornaments of candelabra, chandeliers, &c.

In Fig. I, A A represent the body of the iron mold. *a a* are the sides of the mold which come in contact with the exterior surfaces of the bowl or body of the beer-glass. These, *a a*, are thin and separated to a considerable extent from the body of the mold by the open spaces *b b*, which extend round the mold. At the bottom of the stand or pedestal of the glass *c* the thickness of the metal in the mold is reduced by the arched or rounded recess *d*, directly under *c*.

In Fig. II, which is the mold for a bottle-stopper, the mold is reduced in thickness at *d*, contiguous to the surface of the head of the stopper c, which is the only part of the stopper usually desired to have the polished appearance.

In Figs. III, IV the same manner of constructing the mold is adopted as in Fig. I, the form of the mold being changed to suit the shape of the tumbler.

Having thus described my improvements and their operation and the manner of constructing the same, what I claim as my invention, and for which I desire Letters Patent, is—

The bringing of the molten glass in contact with a thinner portion of the metal of the mold than the body of the mold itself, so that the part of the mold in contact with the glass will be immediately raised in temperature so as not to chill the surface of the glass, and at the same time the heat so imparted will be moderated and diffused gradually into the thicker parts of the mold, thereby producing the desired smoothness and appearance of polish upon the surface of the glass, substantially in the manner described.

WILLIAM POUNTNEY.

Witnesses:
J. B. STAPLES,
H. WILLIAMS.